(12) United States Patent
Harper (10) Patent No.: US 7,987,629 B2
(45) Date of Patent: Aug. 2, 2011

(54) RODENT BAIT STATION

(75) Inventor: Jim M. Harper, San Clemente, CA (US)

(73) Assignee: Technicide, Inc., San Clemente, CA (US)

( * ) Notice: Subject to any disclaimer, the term of this patent is extended or adjusted under 35 U.S.C. 154(b) by 0 days.

(21) Appl. No.: 12/241,008

(22) Filed: Sep. 29, 2008

(65) Prior Publication Data

US 2009/0139133 A1    Jun. 4, 2009

Related U.S. Application Data

(60) Provisional application No. 60/976,384, filed on Sep. 28, 2007.

(51) Int. Cl.
*A01M 25/00* (2006.01)
(52) U.S. Cl. .............. 43/131; 220/525; 220/526
(58) Field of Classification Search .............. 43/131, 43/4, 55, 54.1; 206/745, 751, 752, 756; 220/500, 220/501, 507, 525, 526
See application file for complete search history.

(56) References Cited

U.S. PATENT DOCUMENTS

| | | | | |
|---|---|---|---|---|
| 570,199 A | * | 10/1896 | Caplinger | 220/525 |
| 759,030 A | * | 5/1904 | Sheaffer | 43/131 |
| 1,531,358 A | * | 3/1925 | Thompson et al. | 220/525 |
| 1,572,098 A | * | 2/1926 | Wiggins | 43/131 |
| 1,633,982 A | * | 6/1927 | Davis | 43/131 |
| 1,700,517 A | * | 1/1929 | Ross | 43/131 |
| 1,817,562 A | * | 8/1931 | Hodge | 43/54.1 |
| 1,896,827 A | * | 2/1933 | Neely | 43/54.1 |
| 1,964,611 A | * | 6/1934 | Watson | 43/131 |
| 2,138,190 A | * | 11/1938 | Myers | 43/55 |
| 2,157,953 A | * | 5/1939 | De Long | 43/131 |
| 2,214,993 A | * | 9/1940 | De Witt | 220/525 |
| 2,267,640 A | * | 12/1941 | De Witt | 43/54.1 |
| 2,532,681 A | * | 12/1950 | Stover | 43/131 |
| 2,555,073 A | * | 5/1951 | Zdankoski | 43/55 |
| 2,568,168 A | * | 9/1951 | Query | 43/131 |
| 2,603,549 A | * | 7/1952 | Tessmer et al. | 43/54.1 |
| 2,604,372 A | * | 7/1952 | Klinglesmith | 43/54.1 |
| 2,635,382 A | * | 4/1953 | Kuntz | 43/131 |
| 2,638,240 A | * | 5/1953 | Lundstrom | 206/538 |
| 2,664,663 A | * | 1/1954 | Mullen | 43/131 |
| 2,690,028 A | * | 9/1954 | Mullen | 43/131 |
| 2,710,485 A | * | 6/1955 | Starr | 43/131 |
| 2,725,663 A | * | 12/1955 | Mullen | 43/131 |
| 2,725,664 A | * | 12/1955 | Mullen | 43/131 |
| 2,750,707 A | * | 6/1956 | Ekstedt | 43/131 |

(Continued)

FOREIGN PATENT DOCUMENTS

DE    4134678 A1 * 10/1992

(Continued)

*Primary Examiner* — Darren W Ark (74) *Attorney, Agent, or Firm* — Knobbe Martens Olson & Bear, LLP (57) ABSTRACT

An embodiment of a bait station comprises a rotatable lid and air-tight bait compartments. An additional compartment also contains bait and is accessible to rodents as they enter the station. The rotatable lid is configured to hold the bait within the compartments and can be rotated in order to replace the previously accessible bait with fresh bait from a different compartment. A key can be attached to an extension pole in order to unlock and rotate the rotatable lid without requiring a person to kneel down or bend over. A base having two entrances provides an inviting environment for rodents.

6 Claims, 7 Drawing Sheets

U.S. PATENT DOCUMENTS

| | | | |
|---|---|---|---|
| 2,762,674 A * | 9/1956 | Sauvago | 220/525 |
| 2,764,840 A * | 10/1956 | Mayfield | 43/131 |
| 2,765,576 A * | 10/1956 | Kurek | 43/54.1 |
| 2,772,511 A * | 12/1956 | Tomasek | 43/131 |
| 2,774,466 A * | 12/1956 | Liska | 220/525 |
| 2,927,395 A * | 3/1960 | Bartlett | 43/57.2 |
| 2,944,364 A * | 7/1960 | Kelly | 43/131 |
| 2,953,868 A * | 9/1960 | Chambers | 43/131 |
| 2,997,022 A * | 8/1961 | Kay | 43/131 |
| 3,008,262 A * | 11/1961 | Ronicker | 43/131 |
| 3,022,600 A * | 2/1962 | Glascoff | 43/57.1 |
| 3,122,857 A * | 3/1964 | Yates | 43/131 |
| 3,159,441 A * | 12/1964 | Silona | 43/54.1 |
| 3,171,566 A * | 3/1965 | Mitchell | 43/54.1 |
| 3,378,134 A * | 4/1968 | Wilkinson et al. | 43/54.1 |
| 3,427,743 A * | 2/1969 | Brunner et al. | 43/131 |
| 3,488,879 A * | 1/1970 | Laughlin | 43/131 |
| 3,524,571 A * | 8/1970 | Geiger et al. | 220/525 |
| 3,772,820 A * | 11/1973 | Bond | 43/131 |
| 3,864,867 A * | 2/1975 | Dry | 43/131 |
| 3,947,991 A * | 4/1976 | Morcom | 43/54.1 |
| 4,026,064 A * | 5/1977 | Baker | 43/131 |
| 4,067,607 A * | 1/1978 | Battles | 312/235.2 |
| 4,083,452 A * | 4/1978 | Rossmo | 206/534 |
| 4,194,690 A * | 3/1980 | Stever et al. | 43/131 |
| 4,208,829 A * | 6/1980 | Manning | 43/131 |
| 4,211,028 A * | 7/1980 | Roberling | 43/131 |
| 4,226,335 A * | 10/1980 | Sowards | 43/55 |
| 4,228,613 A * | 10/1980 | Kalnasy et al. | 43/131 |
| 4,245,742 A * | 1/1981 | Rossmo | 206/534 |
| 4,251,946 A * | 2/1981 | Lindley | 43/131 |
| 4,261,132 A * | 4/1981 | Carothers et al. | 43/131 |
| 4,349,982 A * | 9/1982 | Sherman | 43/131 |
| 4,364,194 A * | 12/1982 | Clark, Sr. | 43/131 |
| 4,366,641 A * | 1/1983 | Price et al. | 43/54.1 |
| 4,400,904 A * | 8/1983 | Baker | 43/131 |
| 4,413,440 A * | 11/1983 | Schultz | 43/131 |
| 4,453,337 A * | 6/1984 | Williams | 43/131 |
| 4,538,862 A * | 9/1985 | Chandler | 312/283 |
| 4,541,198 A * | 9/1985 | Sherman | 43/131 |
| 4,550,525 A * | 11/1985 | Baker et al. | 43/131 |
| 4,563,834 A * | 1/1986 | Spencer | 43/57.1 |
| 4,570,377 A * | 2/1986 | Primavera | 43/131 |
| 4,572,376 A * | 2/1986 | Wrennall | 206/538 |
| 4,658,536 A * | 4/1987 | Baker | 43/131 |
| 4,660,320 A * | 4/1987 | Baker et al. | 43/131 |
| 4,663,882 A * | 5/1987 | Koljonen | 43/131 |
| 4,730,412 A * | 3/1988 | Sherman | 43/131 |
| 4,741,441 A * | 5/1988 | Keffeler | 206/538 |
| 4,744,614 A * | 5/1988 | Gombosi | 43/54.1 |
| 4,746,033 A * | 5/1988 | Morellini | 43/131 |
| 4,747,230 A * | 5/1988 | Zalesky | 43/131 |
| 4,756,412 A * | 7/1988 | Graves et al. | 43/54.1 |
| 4,765,091 A * | 8/1988 | Sherman | 43/131 |
| 4,793,093 A * | 12/1988 | Gentile | 43/131 |
| 4,821,452 A * | 4/1989 | Beckley | 43/131 |
| 4,825,581 A * | 5/1989 | Dailey | 43/131 |
| 4,999,943 A * | 3/1991 | Crabtree | 43/54.1 |
| 5,011,018 A * | 4/1991 | Keffeler | 206/538 |
| 5,038,516 A * | 8/1991 | Doucette | 43/131 |
| 5,048,225 A * | 9/1991 | Brandli | 43/131 |
| 5,272,832 A * | 12/1993 | Marshall et al. | 43/131 |
| 5,311,698 A * | 5/1994 | Plost | 43/54.1 |
| 5,337,892 A * | 8/1994 | Zaffina | 43/54.1 |
| 5,397,033 A * | 3/1995 | Blomquist | 43/131 |
| 5,448,852 A * | 9/1995 | Spragins et al. | 43/131 |
| 5,628,143 A * | 5/1997 | Doucette | 43/131 |
| 5,636,469 A * | 6/1997 | Pizzolo et al. | 43/55 |
| 5,636,470 A * | 6/1997 | Blomquist | 43/131 |
| 5,664,697 A * | 9/1997 | Lambelet et al. | 206/533 |
| 5,749,168 A * | 5/1998 | Chrysanthis | 43/131 |
| 5,806,237 A * | 9/1998 | Nelson et al. | 43/131 |
| 5,857,286 A * | 1/1999 | Doucette | 43/131 |
| 5,870,853 A * | 2/1999 | Williams | 43/131 |
| 5,875,586 A * | 3/1999 | Ballard et al. | 43/131 |
| 5,918,410 A * | 7/1999 | Knuppel | 43/131 |
| 5,921,394 A * | 7/1999 | Shroff | 206/534 |
| 5,921,395 A * | 7/1999 | Alexander | 206/538 |
| 5,934,010 A * | 8/1999 | Blackburn | 43/54.1 |
| 5,966,863 A * | 10/1999 | Payton et al. | 43/131 |
| 6,000,168 A * | 12/1999 | Demusz et al. | 43/55 |
| 6,003,266 A * | 12/1999 | Woodruff | 43/131 |
| 6,082,042 A * | 7/2000 | Issitt | 43/131 |
| 6,145,242 A * | 11/2000 | Simpson | 43/131 |
| 6,189,259 B1 * | 2/2001 | Soller | 43/131 |
| 6,192,621 B1 * | 2/2001 | Fain | 43/131 |
| 6,193,062 B1 * | 2/2001 | Rysgaard et al. | 43/54.1 |
| 6,219,961 B1 * | 4/2001 | Ballard et al. | 43/131 |
| 6,272,791 B1 * | 8/2001 | Pleasants | 43/131 |
| 6,470,622 B1 * | 10/2002 | Braun | 43/131 |
| 6,474,015 B1 * | 11/2002 | Lund et al. | 43/131 |
| 6,474,016 B2 * | 11/2002 | Snell et al. | 43/131 |
| 6,651,378 B2 * | 11/2003 | Baker | 43/131 |
| 6,655,079 B1 * | 12/2003 | Bernard et al. | 43/131 |
| 6,671,999 B1 * | 1/2004 | Doucette | 43/131 |
| 6,729,067 B2 * | 5/2004 | Lund et al. | 43/131 |
| 6,792,713 B2 * | 9/2004 | Snell | 43/124 |
| 6,807,768 B2 * | 10/2004 | Johnson et al. | 43/131 |
| 6,813,858 B1 * | 11/2004 | Wright | 43/131 |
| 6,901,694 B1 * | 6/2005 | Neault et al. | 43/131 |
| 6,990,769 B2 * | 1/2006 | Wright | 43/131 |
| 7,156,226 B1 * | 1/2007 | Van Sickle | 220/524 |
| 7,159,720 B2 * | 1/2007 | Pearson | 206/533 |
| 7,422,254 B2 * | 9/2008 | Weiss | 43/131 |
| 7,513,367 B2 * | 4/2009 | Wolpow | 206/538 |
| 7,607,386 B2 * | 10/2009 | Wise | 220/525 |
| 7,748,554 B2 * | 7/2010 | Murphy | 206/538 |
| 2004/0244274 A1 * | 12/2004 | Dellevigne et al. | 43/131 |
| 2005/0252074 A1 * | 11/2005 | Duston et al. | 43/131 |
| 2007/0045150 A1 * | 3/2007 | Huffer et al. | 206/538 |
| 2008/0104882 A1 * | 5/2008 | Bernard et al. | 43/131 |
| 2008/0110079 A1 * | 5/2008 | Jeffries | 43/55 |
| 2008/0110197 A1 * | 5/2008 | Manas et al. | 220/500 |
| 2008/0296187 A1 * | 12/2008 | Butzen et al. | 220/507 |
| 2009/0031610 A1 * | 2/2009 | Dudney | 43/26 |
| 2009/0100744 A1 * | 4/2009 | Endepols | 43/131 |
| 2009/0199458 A1 * | 8/2009 | Highet et al. | 43/131 |
| 2009/0307963 A1 * | 12/2009 | Abbas | 43/131 |

FOREIGN PATENT DOCUMENTS

| | | |
|---|---|---|
| DE | 4431694 A1 * | 3/1996 |
| DE | 10104345 A1 * | 9/2002 |
| DE | 10208138 A1 * | 9/2003 |
| DE | 10307024 A1 * | 9/2004 |
| EP | 1057958 A2 * | 12/2000 |
| EP | 1197146 A1 * | 4/2002 |
| EP | 1201124 A2 * | 5/2002 |
| EP | 1459625 A1 * | 9/2004 |
| FR | 2557425 A1 * | 7/1985 |
| FR | 2750573 A1 * | 1/1998 |
| GB | 2096446 A * | 10/1982 |
| GB | 2249249 A * | 5/1992 |
| GB | 2382515 A * | 6/2003 |
| GB | 2384966 A * | 8/2003 |
| GB | 2394642 A * | 5/2004 |
| JP | 10327734 A * | 12/1998 |
| JP | 2009159938 A * | 7/2009 |
| WO | WO 8203968 A1 * | 11/1982 |
| WO | WO 9963812 A1 * | 12/1999 |
| WO | WO 02102147 A1 * | 12/2002 |
| WO | WO 2004098281 A1 * | 11/2004 |
| WO | WO 2005006857 A2 * | 1/2005 |
| WO | WO 2005107450 A1 * | 11/2005 |
| WO | WO 2007147550 A1 * | 12/2007 |

* cited by examiner

RODENT BAIT STATION

This application claims the benefit of U.S. Provisional Application No. 60/976,384, filed Sep. 28, 2007, which is incorporated by reference in its entirety as if set forth fully herein.

BACKGROUND OF THE INVENTION

1. Field of the Invention

The present invention relates generally to the field of rodent baiting devices and procedures.

2. Description of the Related Art

Bait stations containing poisoned bait are commonly used to kill rodents. When a bait station is to be placed in an area people can access, it is important that the bait station be secure and tamper-resistant so that children and others cannot access the bait. Many rodent bait stations have double locking mechanisms or special keys which are complicated and difficult to operate. A service specialist who replaces the bait must squat or kneel down to perform service on a typical bait station. This can be very time consuming and physically taxing when a service specialist must service hundreds of bait stations.

Other bait stations are also limited to a single compartment so that a person must replace the bait with new bait each time the bait has been eaten or has expired. In addition, most service contracts require that the bait be replaced with new bait during every service. This requires additional effort because bulk supplies of bait must be carried to each station for replacement.

SUMMARY OF THE INVENTION

Accordingly, there is a need in the art for a bait station that can be easily serviced without kneeling or squatting, and one that doesn't require carrying bulk bait supplies to the station each time the bait needs to be replaced. An embodiment of a bait station includes separate compartments for storing bait and at least one compartment that is accessible to rodents. The bait is attached to a rotatable member which is configured to hold the bait portions within the separate compartments. As the rotatable member is rotated, the portions of bait can be moved into different compartments, and bait which was previously being stored can be made accessible to rodents. An expired portion of bait can be replaced with a fresh portion of bait by simply rotating the rotatable member.

In one embodiment, the bait station comprises a lock integrated into the rotatable member which is configured to prevent tampering with the bait. A key is configured to unlock and rotate the rotatable member. The key is also configured with an attachment portion and threads so that it can be attached to an extension pole or standard broom stick. With the key on an extension pole, the person servicing the bait station is not required to kneel down or squat in order to replace the bait.

In another embodiment, the storage compartments are configured to be air-tight and each compartment is separated from the others by inner walls. In yet another embodiment, the bait station comprises three storage compartments and one compartment accessible to rodents. The upper member is a rotatable lid which fits over the compartments and comprises bait assemblies which correspond to the compartments. The rotatable lid can be removed and rotated using a key and extension pole.

All of the embodiments summarized above and below are intended to be within the scope of the invention herein disclosed. However, despite the foregoing and ensuing discussion of certain embodiments, only the appended claims (and not the present summary) are intended to define the invention. The summarized embodiments, and other embodiments of the present invention, will become readily apparent to those skilled in the art from the following detailed description of the preferred embodiments having reference to the attached figures, the invention not being limited to any particular embodiment(s) disclosed.

DETAILED DESCRIPTION OF THE PREFERRED EMBODIMENT

Figure 1:
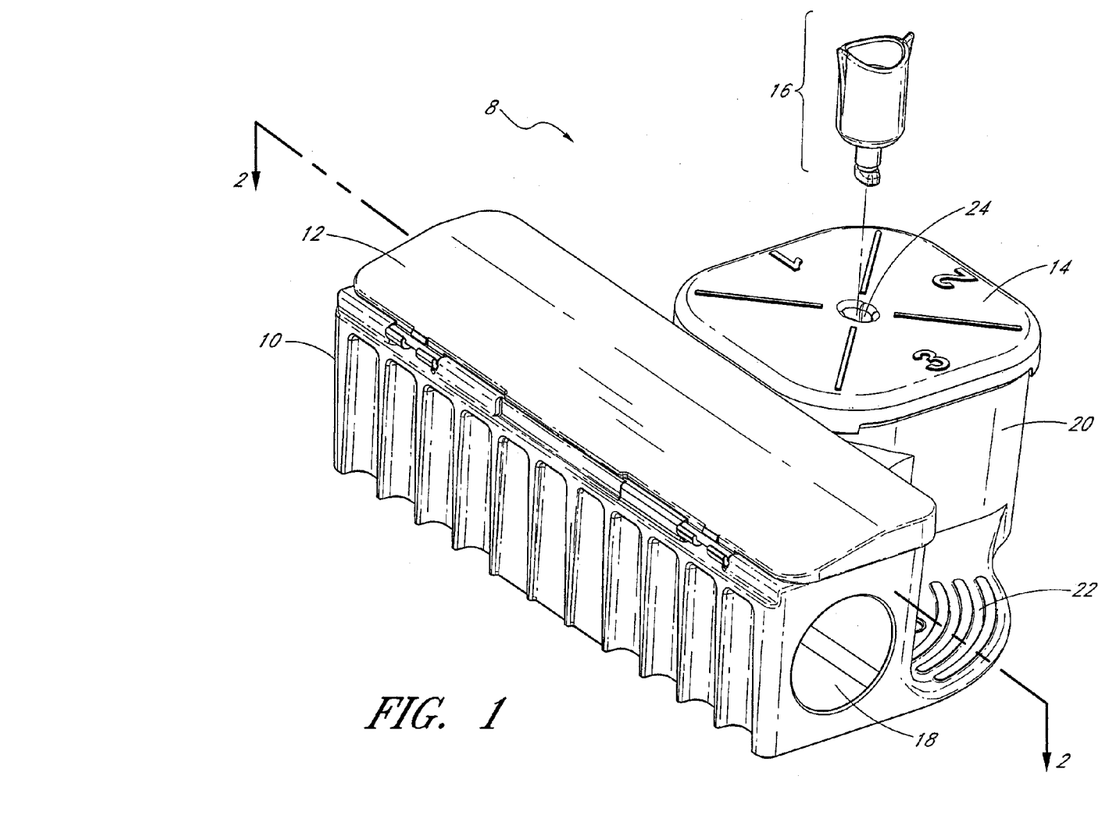
FIG. 1 is a perspective view of an embodiment of a bait station.

FIG. 1 depicts an embodiment of a bait station 8 comprising a base 10, a hinge lid, a rotatable lid 14, and a key 16. The base 10 includes an entry portion 18, a bait compartment 20 portion, and foot platforms 22. The foot platforms can be stepped on to secure the bait station during servicing. The rotatable lid covers 14 the compartment portion 20 of the base, and there is a lock 24 on the top of the rotatable lid which corresponds to a unique key. The hinge lid 12 is positioned over the entry portion 18 of the base 10.

Figure 2:
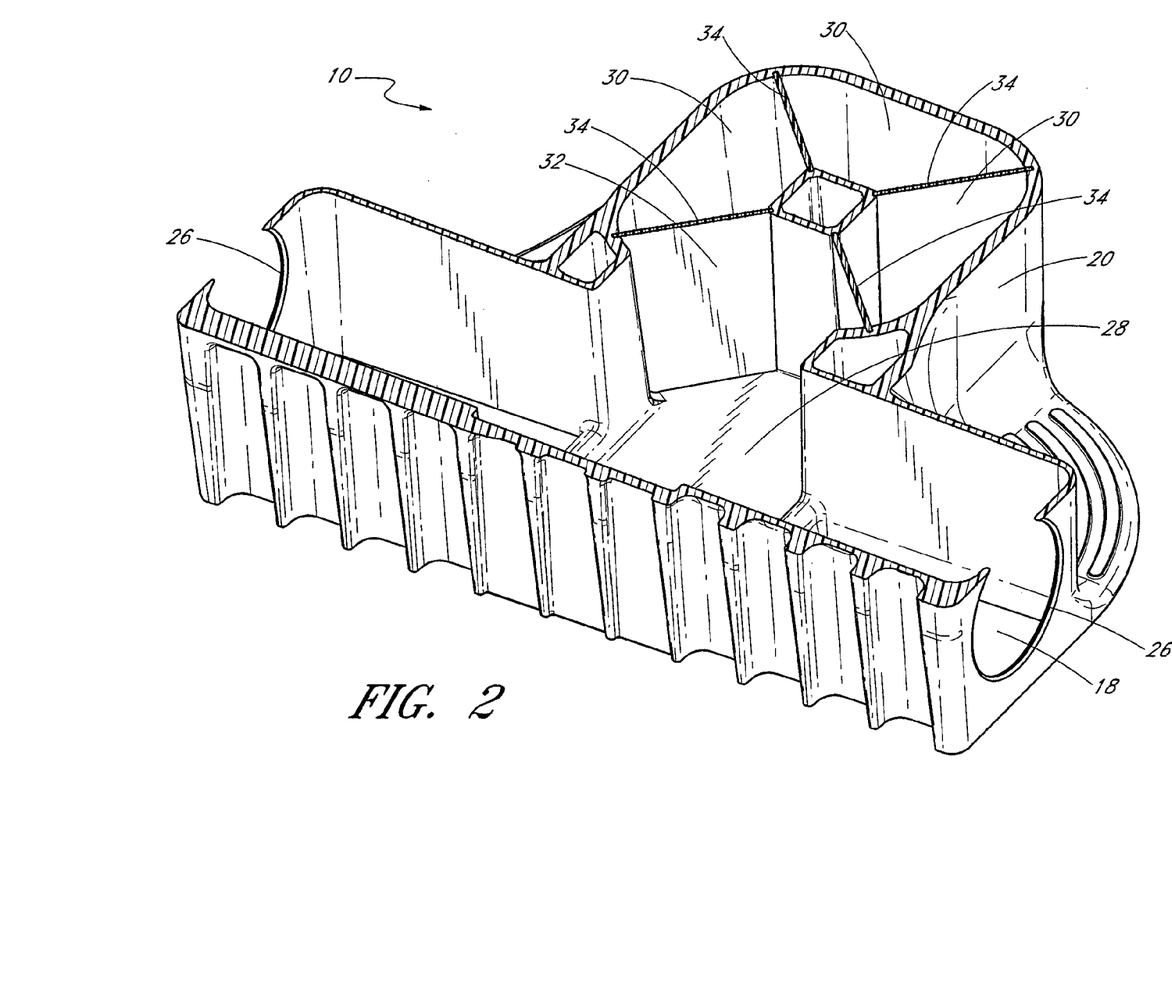
FIG. 2 is a cross-sectional view of the bait station in FIG. 1.

FIG. 2 shows the different portions of the base 10 in an embodiment of the bait station. The entry portion 18 includes two holes 26 through which rodents can enter and exit the bait station 18. A passageway 28 exists connecting the entry portion 18 to the compartment portion 20. The compartment portion 20 comprises three air-tight compartments 30 and one compartment 32 that is open to the passageway 28 and accessible to rodents. The compartments 30, 32 may be separated by removable wall inserts 34 which are configured to assure an air-tight environment within the compartments 30 when the rotatable lid 14 is locked onto the base 10.

Figure 3:
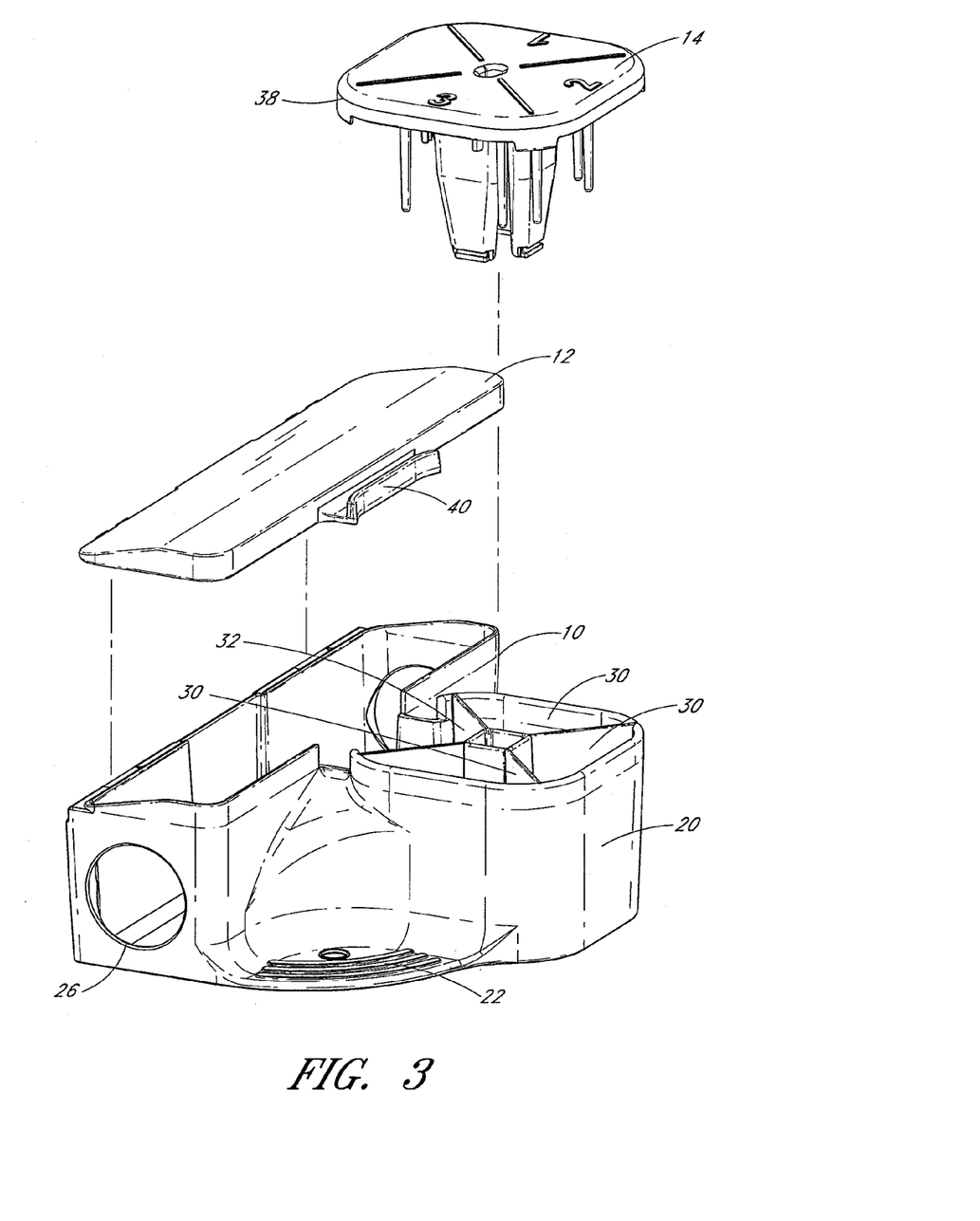
FIG. 3 is an exploded perspective view of the bait station in FIG. 1.

FIG. 3 is an exploded view of an embodiment of the bait station 8 showing how the different parts are assembled. The rotatable lid 14 fits over the compartment portion 20 of the base 10, positioning the bait holders 36 in corresponding compartments 30, 32. When removed, the lid 14 can be rotated ninety degrees and repositioned on the base so that a different bait holder corresponds to the rodent-accessible compartment. In this manner, fresh bait can be made accessible to rodents by simply rotating the rotatable lid 14, instead of replacing the bait each time the accessible bait expires. A key is configured to release the lock 24 on the rotatable lid 14 so that it can be removed from the base 10 and rotated. The outer lip of the rotatable lid interlocks with a corresponding lip 40 on the hinge lid 12 to secure the hinge lid 12 in the closed position. When the rotatable lid 14 is locked in place, the hinge lid 12 cannot be opened so that unauthorized persons can not access any bait by opening the hinge lid 12.

Figure 4:
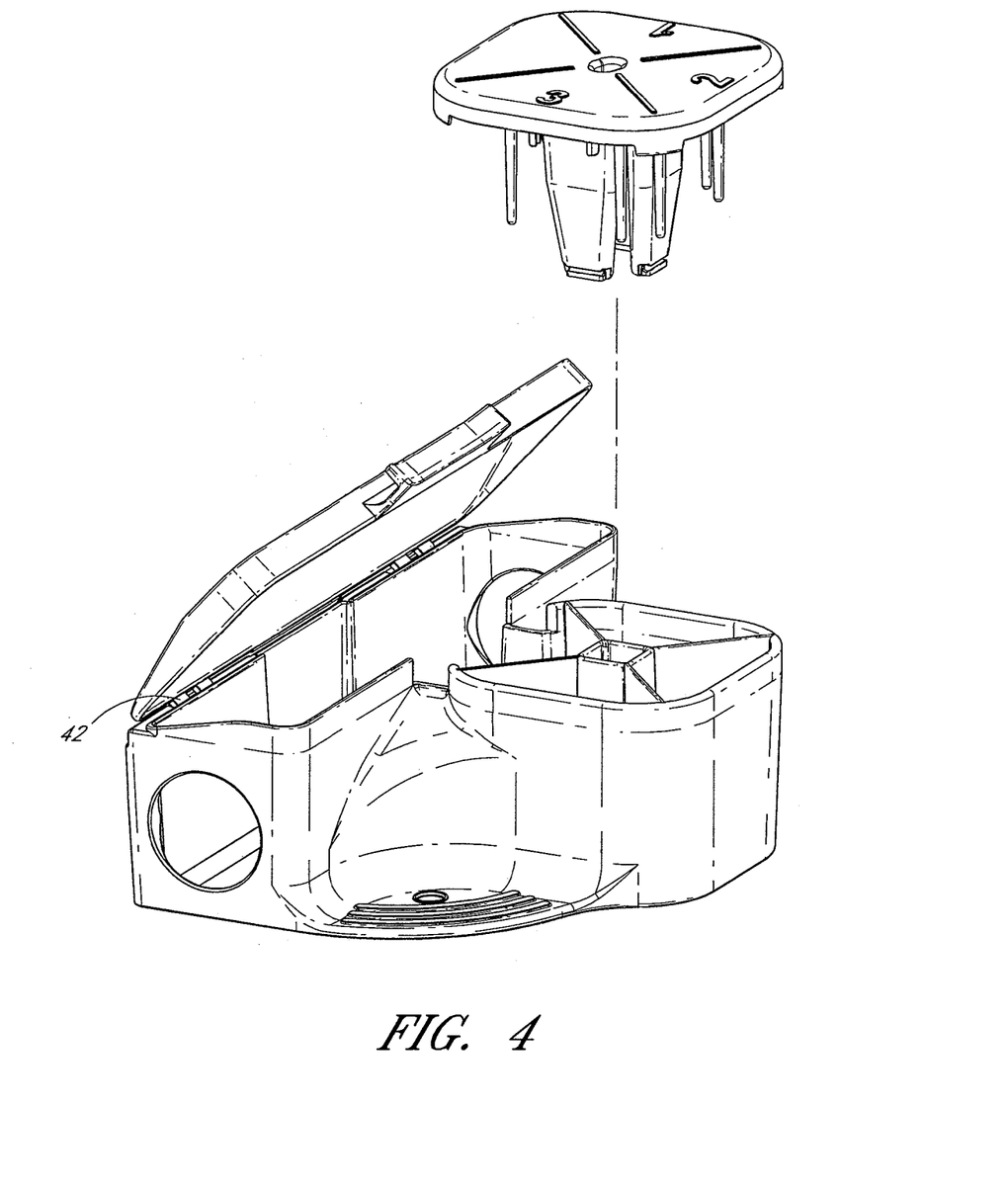
FIG. 4 is a perspective view of the bait station of FIG. 1 with the hinge lid opened.

In one embodiment, the hinge lid 12 is connected to the base by hinges 42 as shown in FIG. 4. When the rotatable lid 14 is removed, the hinge lid 12 can be opened and the entry portion 18 can be accessed and serviced if necessary.

Figure 5A:
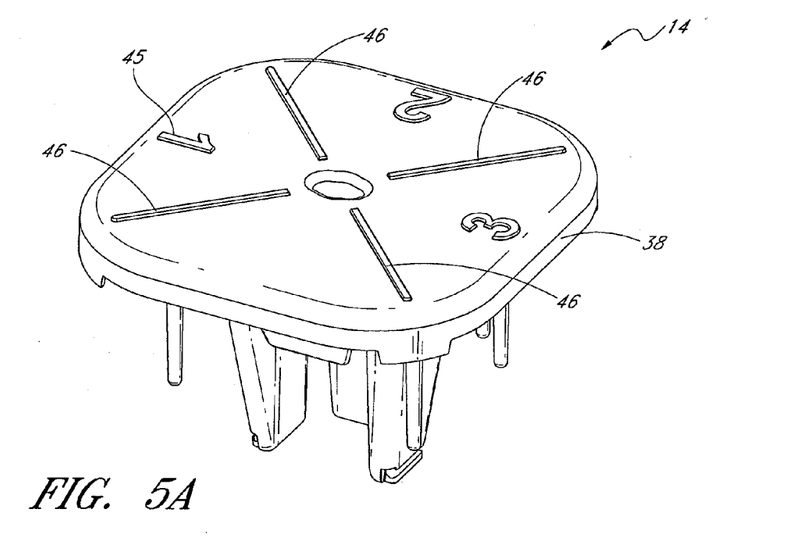
FIG. 5A is a perspective view of an embodiment of a rotatable lid.
Figure 5B:
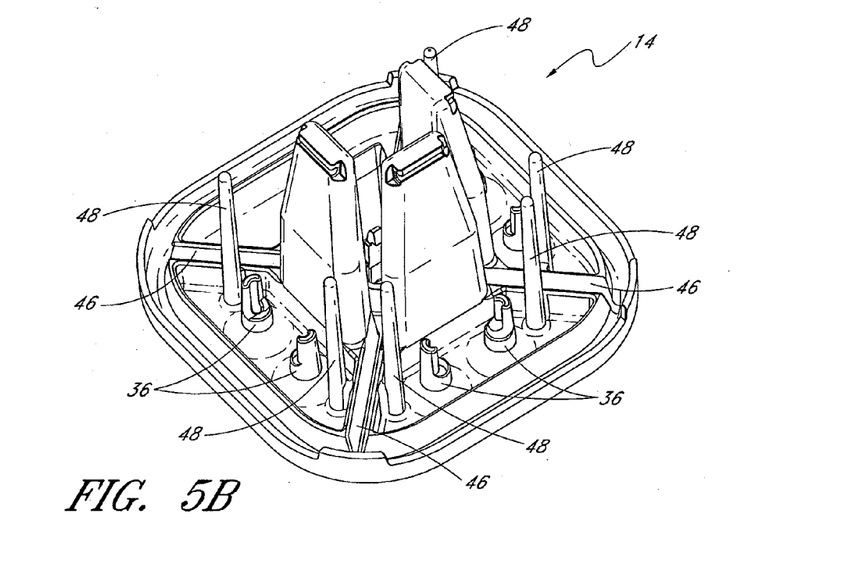
FIG. 5B is a perspective view from below of an embodiment of a rotatable lid.

FIGS. 5A and 5B show an embodiment of a rotatable lid 14. There is a lock hole 24 in the center of the rotatable lid 14 and a lip 38 exists along the entire outer edge. Visual indicators 45 are located on the upper portion of the lid 14 for indicating when portions of bait 54 should be rotated or replaced. Slots 46 are built into the rotatable lid 14, which correspond to the wall inserts 34 separating the compartments 30, 32 in the base 10. Several wall guides 48 extend vertically from the rotatable lid 14 near the slots 46. Bait rod holders 36 are positioned on the lid so that bait assemblies can be attached to the lid and suspended into the compartments 30, 32 of the base 10. Bait rod clips 52 also extend vertically from the lid 14 as a means of securing the wire bait assemblies 50 in a proper position within the base compartments.

In other embodiments, the compartment walls can be fixed to the rotatable lid so that, as the lid is rotated, the compartments rotate and a different compartment is exposed to the rodent-accessible area. In such an embodiment, the base may have slots that correspond to the compartment walls or the compartment walls may be configured to create a seal with the base portion.

In still other embodiments, the rotatable lid 14 and compartment walls can be rotated without removing the lid from the base. A key can be used to unlock the lid and rotate the compartments without lifting the lid from the bait station. A circular configuration allows the compartments to be rotated within the bait station exposing a different compartment.

Figure 6:
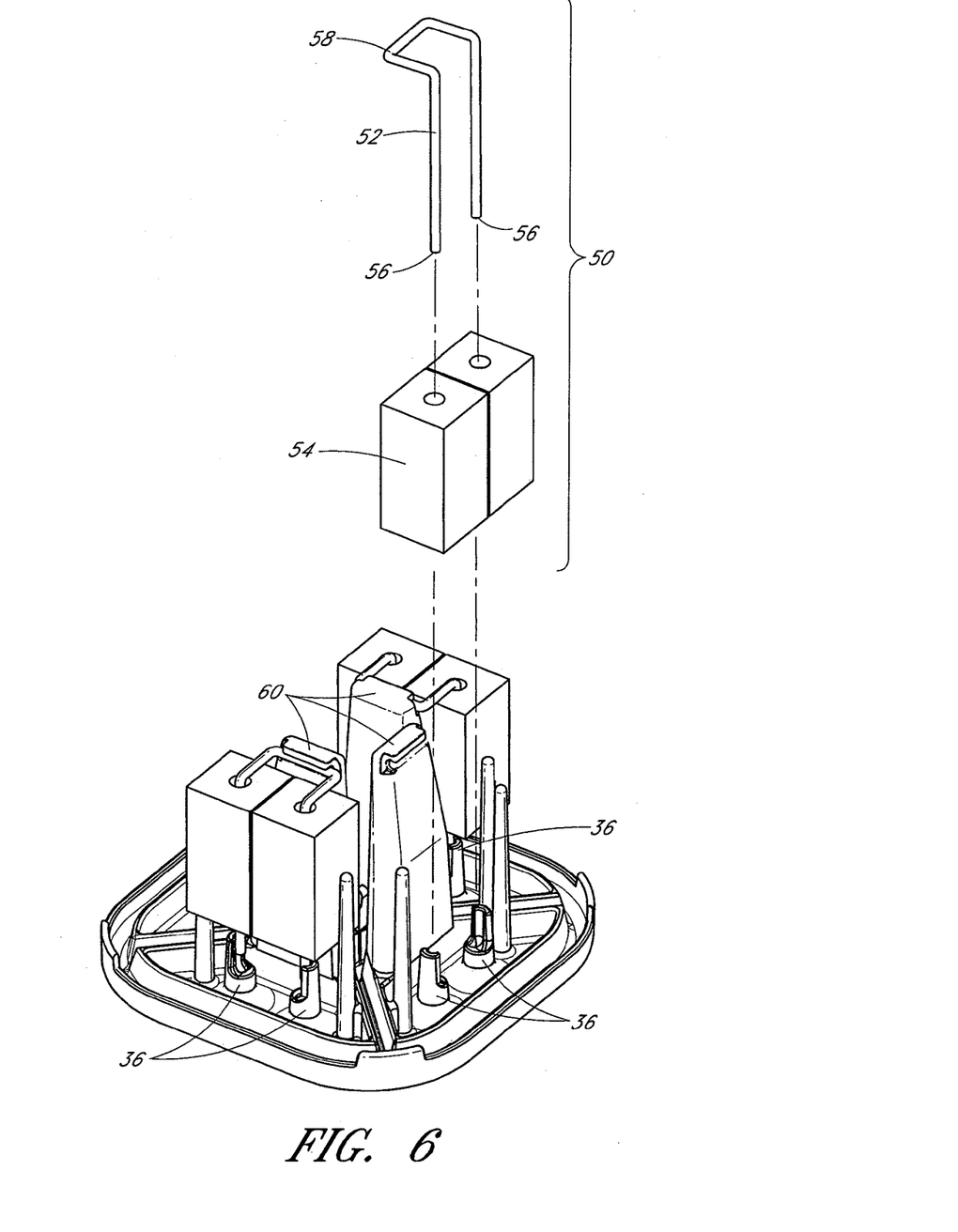
FIG. 6 is a perspective view of an embodiment of a rotatable lid with exploded bait and bait rod.

FIG. 6 shows an embodiment of a rotatable lid 14 and a bait assembly 50 that can be attached to the lid 14. A bait rod 52 fits through the portions of bait 54 and comprises a clip portion 58 and two holder ends 56. The clip portion 58 is inserted into the bait rod clip 60 and the holder 56 ends fit within the bait rod holders 36. To replace the bait 54, the holder ends 56 can be pressed together and released from the bait rod holder 36. The bait rod 52 can then be rotated about the clip portion within the bait rod clip so that the bait pieces can be removed from the rod 52. New bait pieces can easily be placed on the rod and the holder ends 56 secured again in the bait rod holders 36.

Figure 7A:
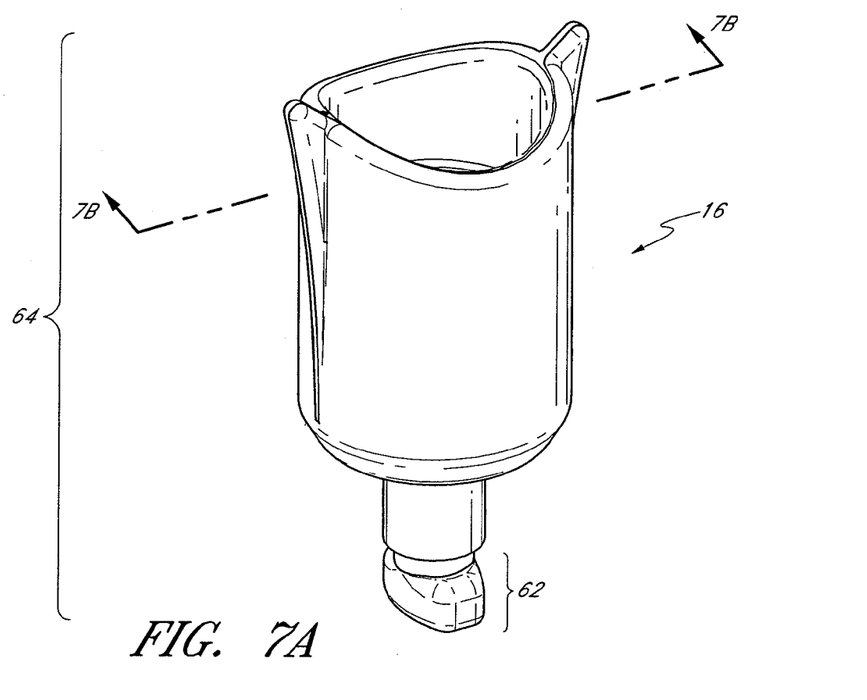
FIG. 7A is a perspective view of an embodiment of a bait station key.
Figure 7B:
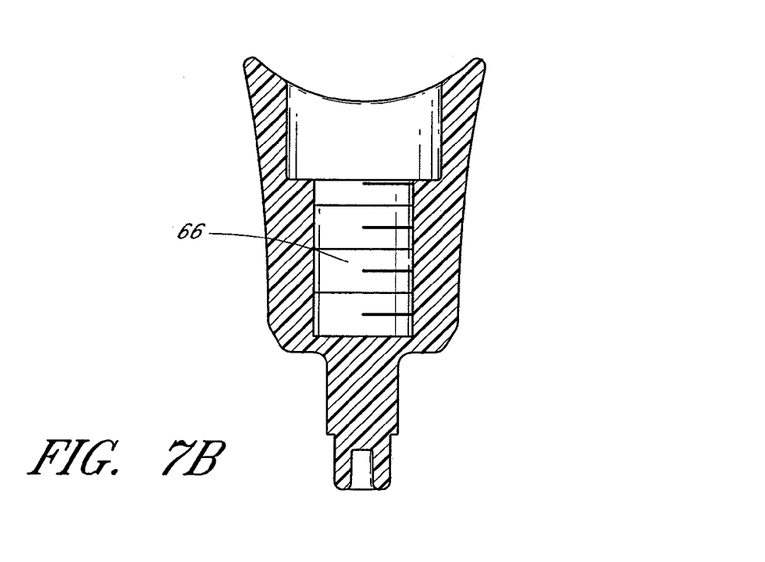
FIG. 7B is a cross-sectional view of an embodiment of a bait station key.

FIGS. 7A and 7B show an embodiment of the key 16 used to unlock the rotatable lid 14 in a bait station 8. The key 16 comprises a lower portion 62 which engages the lock 16 and an upper portion 64 which can be attached to a pole or other extension device (not shown). The upper portion 64 includes a threaded area 66 which can correspond for example, to standard broom handle threads. The key 16 unlocks the rotatable lid 14 from the base 10 and the lower portion 62 also engages the lid 14 so that the lid 14 can be lifted off of the base 10 using the key 16 and extension pole (not shown). Thus, the person servicing the bait station 8 does not need to squat or kneel down when servicing the bait station 8.

A method of using the above and other embodiments comprises providing a bait station as in such embodiments described above, situating the bait station in a location that may be a locus for rodents, and providing the bait station with bait.

In another method, situating the bait station further comprises aligning the station with a surface and securing the station to the surface if desired.

In one method, providing bait comprises a user approaching the station and placing at least one body, such as a foot, wheel, peg, or weight on top of or through a foot platform, into contact with the foot platform so as to secure the bait station in place.

Yet another method comprises employing the bait station to poison rodents. This method further comprises providing the bait station with poisoned bait. One method further comprises providing more than one type of bait to the station.

Another method comprises adjusting the size of the hole to selectively exclude or trap rodents meeting certain size requirements.

Still another method comprises forming an assembly comprising a key secured to the end of an extension pole or device. In another embodiment, a method further comprises determining whether to rotate the rotating lid to make a particular piece of bait accessible from an entry portion. In another embodiment, a method further comprises inserting the key into a key hole, and rotating the compartments by turning the key.

Another method further comprises rotating the compartments in a timed sequence, either with or without a motor that rotates at least a portion of, or an attachment to, a rotatable lid corresponding, for example, to freshness of the bait or type of rodent or any other animal likely present during a given season or time of day.

Another method further comprises removing or adding bait to the compartments selectively as, for example, automatically or manually in a timed sequence corresponding to user preference.

What is claimed is:

1. A bait station comprising:
 a base having a bait storage compartment and a bait delivery passageway, the bait delivery passageway configured to be accessible to rodents through an entry portion, the entry portion having at least one hole big enough for a rodent to fit through,
 a plurality of walls fixed within the bait storage compartment defining a plurality of bait storage sections, one of said plurality of bait storage sections being accessible to the bait delivery passageway,
 a lid connected to a top of the bait storage compartment of the base and configured to hold portions of bait, the lid being configured so that removal, rotation and repositioning of the lid moves the bait portions into different sections of said plurality of bait storage sections, the lid cooperating with the plurality of walls within the bait storage compartment to form substantially air tight bait storage sections except for the one of said plurality of bait storage sections accessible to the bait deliver passageway, the lid having an upper portion and an underside portion to which a plurality of bait portions are coupled such that a number of bait portions corresponds to a number of bait storage sections, each of said plurality of bait portions extending away from the underside portion of the lid, the lid and the bait storage compartment cooperating such that removal, rotation and repositioning of the lid causes each of said plurality of bait portions to pass into an adjacent bait storage section of said plurality of bait storage sections,
 an attachment portion on the upper portion of the lid configured to be attached to an extension pole; and
 a visual indicator on the upper portion of the lid indicating when the bait portions should be rotated or replaced.

2. The bait station of claim 1 where the lid comprises a lock with a corresponding key, the key being configured to attach to the extension pole.

3. The bait station of claim 2, wherein the key comprises a threaded portion which corresponds to general broom handles and extension poles.

4. The bait station of claim 1, wherein the plurality of walls comprise removable walls.

5. The bait station of claim 1, wherein the base comprises a foot platform.

6. The bait station of claim 1, wherein the lid comprises a lock which corresponds to a key, the key being configured to assist in lifting the lid away from the bait station.

* * * * *